United States Patent
Kandasamy et al.

(10) Patent No.: US 10,257,097 B1
(45) Date of Patent: Apr. 9, 2019

(54) CONNECTION BASED SELECTION OF A NETWORK CONGESTION CONTROL PROCESS

(71) Applicant: EMC IP Holding Company LLC, Hopkinton, MA (US)

(72) Inventors: Vijayakumar Kandasamy, Bangalore (IN); Karthikeyan Arunachalam, Chennai (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 95 days.

(21) Appl. No.: 15/285,335

(22) Filed: Oct. 4, 2016

(51) Int. Cl.
| | |
|---|---|
| *G01R 31/08* | (2006.01) |
| *H04L 12/801* | (2013.01) |
| *H04L 12/26* | (2006.01) |
| *H04L 12/841* | (2013.01) |
| *H04L 12/807* | (2013.01) |
| *H04L 29/06* | (2006.01) |

(52) U.S. Cl.
CPC ........ *H04L 47/193* (2013.01); *H04L 43/0852* (2013.01); *H04L 47/12* (2013.01); *H04L 47/27* (2013.01); *H04L 47/283* (2013.01); *H04L 69/16* (2013.01)

(58) Field of Classification Search
USPC ................. 370/235, 231, 230, 236
See application file for complete search history.

(56) References Cited

U.S. PATENT DOCUMENTS

| 8,170,032 B2 * | 5/2012 | Mohri ..................... H04L 29/06 370/395.52 |
| 9,385,960 B2 * | 7/2016 | Wang ....................... H04L 47/27 |
| 2004/0064577 A1 * | 4/2004 | Dahlin .................... H04L 29/06 709/235 |

(Continued)

OTHER PUBLICATIONS

Ahmad et al., "Experimental Evaluation of TCP Congestion Control Mechanisms in Short and Long Distance Networks", Journal of Theoretical and Applied Information Technology, Jan. 2015, pp. 153-166, vol. 71, No. 2, Jatit & LLS.

(Continued)

*Primary Examiner* — Phuongchau Ba Nguyen
(74) *Attorney, Agent, or Firm* — Amin, Turocy & Watson, LLP

(57) ABSTRACT

Connection based selection of a network congestion control process is presented herein. A system can comprise a processor; and a memory that stores executable instructions that, when executed by the processor, facilitate performance of operations, comprising: storing communication congestion control procedures into a module of a kernel of the system; determining a connection attribute for a connection corresponding to a connection request received from a device; and selecting, via the module based on the connection attribute, a communication congestion control procedure of the communication congestion control procedures for servicing of the connection request. In an example, the determining the connection attribute comprises determining a round-trip time of the connection, determining a band- (Continued)

width-delay product of the connection, determining whether the connection is a wireless connection, and determining a bandwidth of the connection.

20 Claims, 11 Drawing Sheets

(56) References Cited

U.S. PATENT DOCUMENTS

| | | | | |
|---|---|---|---|---|
| 2009/0316581 A1* | 12/2009 | Kashyap | ............... | H04L 45/28 370/236 |
| 2012/0213069 A1* | 8/2012 | Oguchi | ............... | H04W 80/06 370/231 |
| 2017/0289838 A1* | 10/2017 | Agrawal | ........... | H04W 28/0273 |

OTHER PUBLICATIONS

"Lecture 11: Transport (UDP, but mostly TCP)", CS 4700 / CS 5700, Network Fundamentals, revised Jul. 27, 2013, 80 pages. Retrieved on Jan. 6, 2017. http://slideplayer.com/slide/7291072/.
"BIC TCP (Binary Increase Congestion Control)", Wikipedia ("The 'free' encyclopedia"), 4 pages. Retrieved on Jan. 6, 2017. https://en.wikipedia.org/wiki/BIC_TCP.
Xu et al., "Binary Increase Congestion Control for Fast, Long Distance Networks", IEEE INFOCOM, Twenty-third Annual Joint Conference of the IEEE Computer and Communications Societies, 2004, IEEE, 13 pages.
Jamal et al., "Performance Analysis of TCP Congestion Control Algorithms", International Journal of Computers and Communications, 2008, pp. 30-38, vol. 2, Issue 1. Retrieved on Sep. 5, 2016. http://www.wseas.us/journals/cc/cc-27.pdf.
"Compound TCP", Internet Research Lab, 4 pages. Retrieved on Sep. 5, 2016. http://ilab.cs.byu.edu/wiki/Compound_TCP.
"Compound TCP", Wikipedia ("The 'free' encyclopedia"), 5 pages. Retrieved on Sep. 5, 2016. https://en.wikipedia.org/w/index.php?title=Compound_TCP&oldid=730899603.
Tan et al., "Compound TCP: A Scalable and TCP-Friendly Congestion Control for High-Speed Networks", 4th International Workshop on Protocols for Fast Long-Distance Networks (PFLDNet), 2006, 8 pages.
"Cubic Top", Wikipedia ("The 'free' encyclopedia"), 4 pages. Retrieved on Jan. 6, 2017. https://en.wikipedia.org/w/index.php?title=CUBIC_TCP&oldid=729270944.
Rhee et al., "CUBIC: A New TCP-Friendly High-Speed TCP Variant", ACM SIGOPS Operating Systems Review—Research and Developments in the Linux Kernel, Jul. 2008, vol. 42, Issue 5, ACM, 6 pages.
Leith et al, "Experimental Evaluation of Delay/Loss-Based TCP Congestion Control Algorithms", 2008, 6 pages. http://www.hamilton.ie/net/delay_tests_final.pdf.
Ha et al., "CUBIC: A New TCP-Friendly High-Speed TCP Variant", 21 pages. Retrieved on Sep. 6, 2016.
Gangadhar et al., "TCP Westwood(+) Protocol Implementation in ns-3", SimuTools '13, Proceedings of the 6th International ICST Conference on Simulation Tools and Techniques, 2013, pp. 167-175, ACM.
"Loadadable Kernel Module", Wikipedia ("The 'free' encyclopedia"), 18 pages. Retrieved on Jan. 6, 2017. https://en.wikipedia.org/wiki/Loadable_kernel_module.
Henderson et al., "The NewReno Modification to TCP's Fast Recovery Algorithm", Standards Track, Apr. 2012, 16 pages. Retrieved on Sep. 5, 2016. https://tools.ietf.org/html/rfc6582.
"TCP Congestion Control", Wikipedia ("The 'free' encyclopedia"), 16 pages. Retrieved on Jan. 6, 2017. https://en.wikipedia.org/wiki/TCP_congestion_control.
"Enabling High Performance Data Transfers", Pittsburgh Supercomputing Center, 19 pages. Retrieved on Jan. 6, 2017. https://www.psc.edu/index.php/networking/641-tcp-tune.
"TCP Westwood", Wikipedia ("The 'free' encyclopedia"), 4 pages. Retrieved on Jan. 6, 2017. https://en.wikipedia.org/wiki/TCP_Westwood.
"TCP Westwood Plus", Wikipedia ("The 'free' encyclopedia"), 5 pages. Retrieved on Jan. 6, 2017. https://en.wikipedia.org/wiki/TCP_Westwood_plus.
Tan et al., "A Compound TCP Approach for High-Speed and Long Distance Networks", IEEE INFOCOM, 2006, 25th IEEE International Conference on Computer Communications, IEEE, 12 pages.
Kehlet, "Tuning TCP for High Bandwidth-Delay Networks", Steve Kehlet's Pages, Nov. 2004, 8 pages.
"What is a Socket", The Java™ Tutorials, Oracle, 1 page. Retrieved on Jan. 6, 2017. https://docs.oracle.com/javase/tutorial/networking/sockets/definition.html.
Casetti et al., "TCP Westwood: End-to-End Congestion Control for Wired/Wireless Networks", Wireless Networks, 2002, Kluwer Academic Publishers, 13 pages.

* cited by examiner

CONNECTION BASED SELECTION OF A NETWORK CONGESTION CONTROL PROCESS

TECHNICAL FIELD

The subject disclosure generally relates to embodiments for connection based selection of a network congestion control process.

BACKGROUND

Conventional packet switching networks are associated with data traffic bursts, i.e., sudden increases/decreases in data traffic flow. In this regard, conventional transmission control protocol (TCP) network technologies use a slow start traffic phase, a congestion avoidance traffic phase, and a fast retransmit and recovery traffic phase to provide congestion control.

Under the slow start traffic phase, a size of a sender's transmission window is initially small, but increases exponentially. After the size of the sender's transmission window is determined to be greater than a threshold, a congestion avoidance phase is selected, in which the size of the sender's transmission window increases linearly. If the sender receives more than a defined number of duplicated acknowledgements (ACKs) during the congestion avoidance phase, the threshold and the sender's transmission window size are reduced, and the fast retransmit and recovery traffic phase is selected. In response to determining that a timeout has occurred, the threshold and the size of the sender's transmission window are further reduced, and the slow start traffic phase is selected. In this regard, conventional congestion control technologies do not optimize use of spare transmission link capabilities, e.g., in high speed networks. Consequently, conventional network technologies have had some drawbacks with respect to controlling network traffic congestion, some of which may be noted with reference to the various embodiments described herein below.

BRIEF DESCRIPTION OF THE DRAWINGS

Non-limiting embodiments of the subject disclosure are described with reference to the following figures, wherein like reference numerals refer to like parts throughout the various views unless otherwise specified.

DETAILED DESCRIPTION

Figure 1:
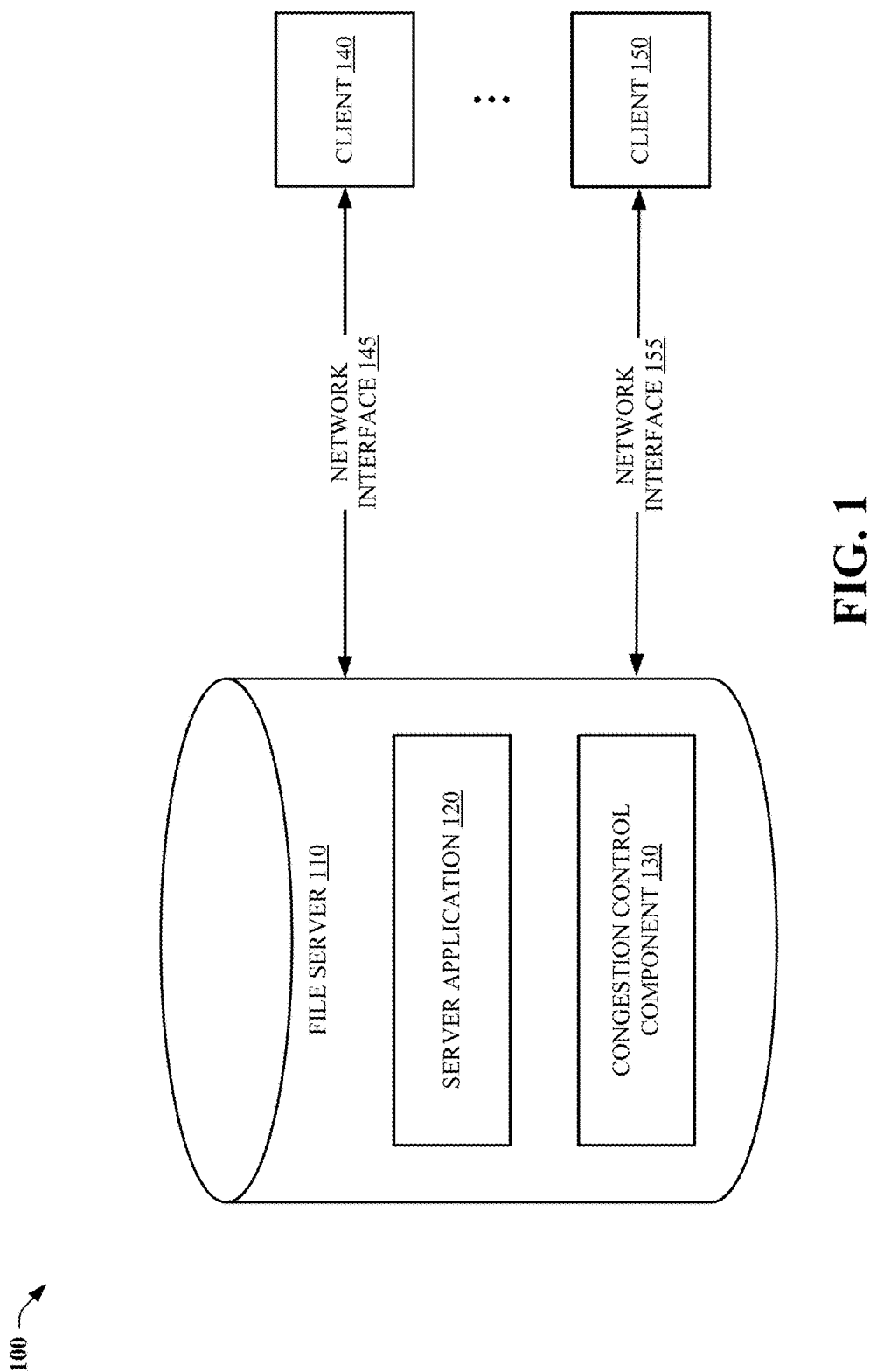
FIG. 1 illustrates a block diagram of a file storage environment associated with connection based selection of a network congestion control process, in accordance with various example embodiments.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

As described above, conventional network technologies have had some drawbacks with respect to optimizing use of spare transmission link capabilities. On the other hand, various embodiments disclosed herein can improve network data transmission by dynamically selecting a network congestion control process based on a determined characteristic of a connection.

For example, a system, e.g., a file server, network file system (NFS) server, etc. can comprise a processor, and a memory that stores executable instructions that, when executed by the processor, facilitate performance of operations, comprising: storing communication congestion control procedures, e.g., algorithms, into a module, e.g., a loadable kernel module (LKM), e.g., an object file comprising executable code, instructions, etc. for extending operations of a kernel of an operating system executing on the file server; and determining a connection attribute for a connection corresponding to a connection request, e.g., a TCP based request, which has been received from a client device.

In embodiment(s), the communication congestion control procedures can comprise a TCP New Reno based procedure that initiates, triggers, etc. a retransmission of data in response to duplicate ACKs being determined to have been received in the connection; a binary increase congestion control (BIC) TCP based procedure that adjusts a size of a congestion window of the connection using a binary search procedure; a cubic TCP based procedure that adjusts the size of the congestion window based on a cubic function of time since a most recent congestion event has been determined to occur; a compound TCP based procedure that adjusts a size of a sending window based on a sum of the size of the congestion window and another size of a delay window; a Westwood TCP based procedure that adjusts congestion control parameters comprising the congestion window and a slow-start threshold (ssthresh), based on a determined rate of ACKs that have been received; and a Westwood Plus(+) TCP based procedure that adaptively adjusts the congestion control parameters based on an amount of bandwidth used at a time that congestion has been determined to occur.

In other embodiment(s), the determining of the connection attributes can comprise determining a round-trip time (RTT) of the connection; determining a bandwidth-delay product (BDP) of the connection; determining whether the connection is a wireless connection; and determining a bandwidth of the connection.

Further, the operations can comprise selecting, via the module based on a connection attribute of the connection, a communication congestion control procedure of the communication congestion control procedures for servicing of the connection request.

In embodiment(s), the servicing of the connection request can comprise: transferring, based on the communication congestion control procedure, data between the system and a client device of the respective client devices corresponding to the connection request.

In one embodiment, the transferring of the data between the system and the client device can comprise receiving, from the client device using the congestion control procedure, the data into a receive buffer of a socket of the system.

In another embodiment, the transferring of the data between the system and the client device can comprise sending, using the congestion control procedure, the data from a send buffer of the socket to the client device.

In one embodiment, a method can comprise: storing, by a system comprising a processor, congestion control routines in a fault tolerant portion of a memory of the system; receiving, by the system, a connection request from a client device, wherein the connection request comprises a request to connect to a communication port of the system; in response to the receiving the connection request, determining, by the system, a characteristic of a communication link between the system and the client device corresponding to the communication port; and based on the characteristic of the communication link, selecting, by the system via the fault tolerant portion of the memory, a congestion control routine of the congestion control routines for servicing of the connection request via the communication link.

In embodiment(s), the determining the characteristic can comprise: determining an RTT of the communication link; determining a BDP of the communication link; determining whether the communication link is a wireless communication link; and/or determining a bandwidth of the communication link.

In other embodiment(s), the servicing of the connection request can comprise: transmitting, using a TCP New Reno procedure, data between the system and the client device via the communication link—the TCP New Reno procedure triggering a retransmission of the data in response to duplicate ACKs being determined to have been received in the communication link; transmitting, using a BIC TCP procedure, the data between the system and the client device via the communication link—the BIC TCP procedure adjusting a size of a congestion window of the communication link using a binary search procedure; or transmitting, using a cubic TCP procedure, the data between the system and the client device via the communication link—the cubic TCP procedure adjusting the size of the congestion window based on a cubic function of time since a most recent congestion event being determined to have occurred in the communication link.

In yet other embodiment(s), the servicing of the connection request can comprise: transmitting, using a compound TCP procedure, the data between the system and the client device via the communication link—the compound TCP procedure adjusting the size of a sending window of the communication link based on a sum of the size of the congestion window and another size of a delay window of the communication link; transmitting, using a Westwood TCP procedure, the data between the system and the client device via the communication link—the Westwood TCP procedure adjusting congestion control parameters comprising the congestion window and a slow-start threshold (ssthresh) of the communication link based a rate of ACKs being determined to have been received in the communication link; or transmitting, using a Westwood+ TCP procedure, the data between the system and the client device via the communication link—the Westwood+ TCP procedure adaptively adjusting the congestion control parameters based on an amount of bandwidth being determined to have been used at a time of congestion within the communication link.

One embodiment can comprise a computer-readable storage medium comprising instructions that, in response to execution, cause a device, e.g., a server device, comprising a processor to perform operations, comprising: storing communication congestion control routines in a kernel of the server device; receiving a connection request from a client device to establish a connection between the server device and the client device; in response to determining a connection characteristic of the connection, choosing, based on the connection characteristic, a communication congestion control routine of the communication congestion control routines; and communicating, via the connection, data between the server device and the client device using on the communication congestion control routine.

In embodiment(s), the determining the connection characteristic of the connection comprises: determining an RTT of the connection; determining a BDP of the connection; determining whether the connection is a wireless connection; and/or determining a bandwidth of the connection.

In one embodiment, the communicating the data comprises receiving, from the client device via the connection using the communication congestion control routine, the data into a receive buffer of a socket of the server device. In another embodiment, the communicating the data comprises sending, via the connection using the communication congestion control routing, the data from a send buffer of the socket to the client device.

As described above, conventional network technologies have had some drawbacks with respect to use of spare transmission link capabilities. Various embodiments described herein can improve network data transmission by dynamically selecting a communication congestion control process for a connection based on a determined characteristic of the connection.

Figure 2:
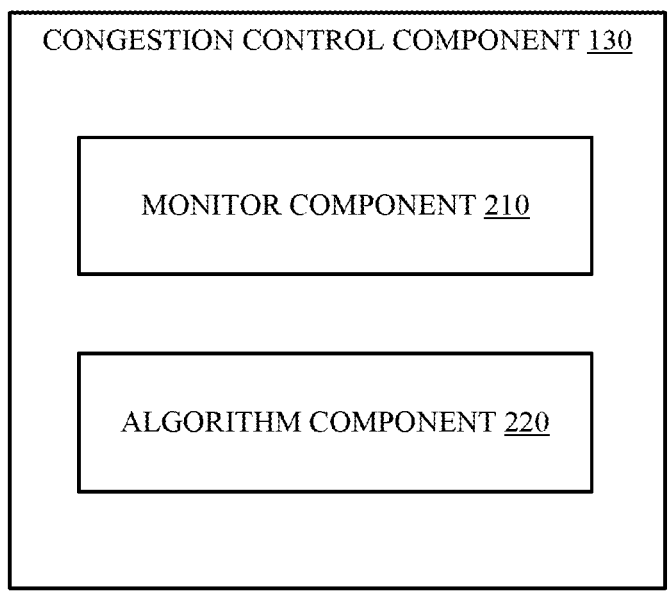
FIG. 2 illustrates a block diagram of a congestion control component, in accordance with various example embodiments.
Figure 3:
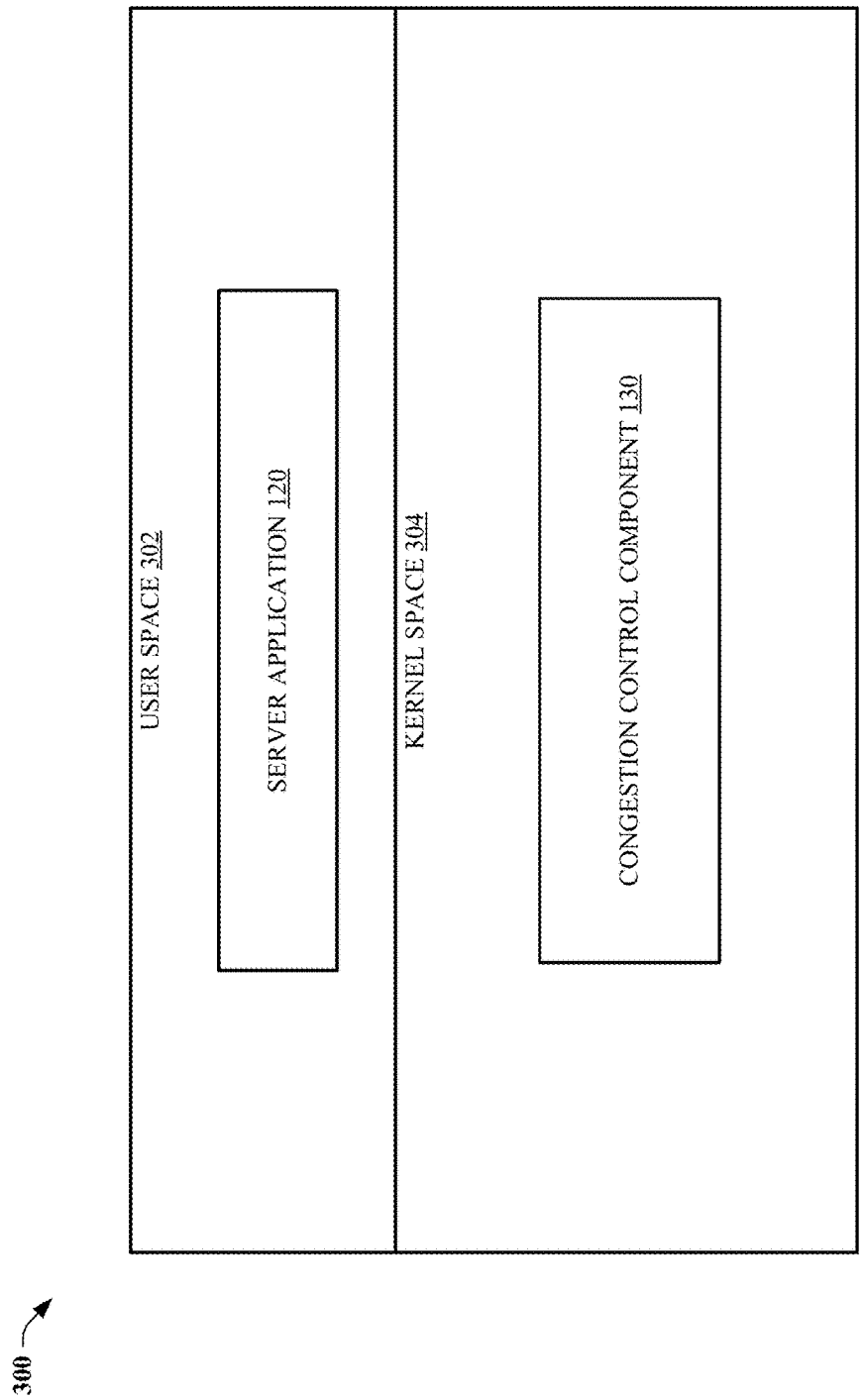
FIG. 3 illustrates a block diagram of a memory of a file server associated with connection based selection of a network congestion control process, in accordance with various example embodiments.

Now referring to FIGS. 1-3, block diagrams of a file storage environment (100) associated with connection based selection of a network congestion control process, a congestion control component (130), and a memory (300) of a file server (110) are illustrated, respectively, in accordance with various embodiments. File server 110 comprises server application 120 and congestion control component 130. Server application 120 can be implemented within user space 302, e.g., a non-protected, non-fault tolerant, etc. portion of memory 300, for transmitting/receiving data to/from respective client devices, e.g., client 140, client 150, etc. In this regard, server application 120 can transmit/receive data to/from a client device using a socket (not shown) implemented in a kernel (kernel space 304), e.g., a protected, fault tolerant, etc. portion of memory 300. In an embodiment, memory 300 can be utilized by a FreeBSD based operating system, e.g., a parallel distributed networked file system (e.g., a OneFS™ file system provided by EMC Isilon Systems), operating via memory 300.

Server application 120 can create a listener, or network endpoint, to "listen" for connection requests, e.g., TCP based requests, from the client device, e.g., to form a connection between the client device and file server 110. In an embodiment, the client device can comprise a Microsoft Windows® device, a Linux® device, a Unix® device, or an Apple® device.

In this regard, and now referring to FIG. 2, congestion control component 130 can comprise monitor component 210 and algorithm component 220. Monitor component 210 can be configured to determine connection attributes for connection requests that have been received from respective client devices. In embodiment(s), monitor component 210 can determine an RTT of a requested connection, e.g., network interface 145, network interface 155, etc.; a bandwidth of the requested connection, a BDP of the requested connection; and/or whether the requested connection is a wireless connection. Further, algorithm component 220 can be configured to store communication congestion control procedures, algorithms, etc. in a module (not shown) of the kernel, e.g., an LKM, an object file comprising executable code/instructions, etc. for extending operations of the kernel.

In embodiment(s), the communication congestion control procedures can comprise: a TCP New Reno based procedure that initiates, triggers, etc. a retransmission of data in response to duplicate ACKs being determined to have been received in an established connection; a BIC TCP based procedure that adjusts a size of a congestion window of the connection using a binary search procedure; a cubic TCP based procedure that adjusts the size of the congestion window based on a cubic function of time since a most recent congestion event has been determined to occur; a compound TCP based procedure that adjusts a size of a sending window based on a sum of the size of the congestion window and another size of a delay window; a Westwood TCP based procedure that adjusts congestion control parameters comprising the congestion window and ssthresh based on a determined rate of ACKs that have been received; and a Westwood+ TCP based procedure that adaptively adjusts the congestion control parameters based on an amount of bandwidth used at a time that congestion has been determined to occur.

Background of the above procedures is provided below:
TCP New Reno

The predecessor of TCP New Reno, TCP Reno, uses a multi-faceted congestion-control strategy to avoid congestion collapse of a connection. For each connection, TCP maintains a congestion window, limiting the total number of unacknowledged packets that may be in transit between devices, e.g., somewhat analogous to TCP's sliding window used for flow control. TCP uses a mechanism called slow start to increase a size of the congestion window after a connection is initialized and after a timeout. The size is initialized to two times the maximum segment size (MSS).

After initialization of the size of the congestion window, a rate of increase of the size of the congestion window is very rapid: for every packet acknowledged, the congestion window increases by 1 MSS, so that the congestion window effectively doubles for every RTT. When the congestion window exceeds ssthresh, TCP Reno enters a new state, called congestion avoidance. In some implementations, the initial ssthresh is large, and so the first slow start usually ends after a loss. However, ssthresh is updated at the end of each slow start, and will often affect subsequent slow starts triggered by timeouts.

Regarding congestion avoidance, as long as non-duplicate ACKs are received, the congestion window is additively increased by one MSS every RTT. When a packet is lost, the likelihood of duplicate ACKs being received is very high. Under TCP Reno, if three duplicate ACKs are received (i.e., four ACKs acknowledging the same packet, which are not piggybacked on data, and do not change the receiver's advertised window), TCP Reno will halve the congestion window, set ssthresh equal to a size of the new congestion window, perform a fast retransmit, and enter a phase called Fast Recovery. If an acknowledgement (ACK) times out, slow start is used, e.g., to reduce the congestion window to 1 MSS on a timeout event.

TCP New Reno improves retransmission during the fast-recovery phase of TCP Reno. During fast recovery, for every duplicate ACK that is returned to TCP New Reno, a new unsent packet from the end of the congestion window is sent, to keep the transmit window full. For every ACK that makes partial progress in the sequence space, the sender assumes that the ACK points to a new hole, and the next packet beyond the acknowledged (ACKed) sequence number is sent.

TCP New Reno can fill large holes, or multiple holes, in the sequence space because the timeout timer is reset whenever there is progress in the transmit buffer. Further, high throughput is maintained during the hole-filling process, even when there are multiple holes of multiple packets, because TCP New Reno can send new packets at the end of the congestion window during fast recovery. When TCP New Reno enters fast recovery it records the highest outstanding unacknowledged packet sequence number. When this sequence number is acknowledged, TCP New Reno returns to the congestion avoidance state.

BIC TCP

BIC TCP uses a binary search algorithm to adjust the congestion window, and views congestion control as a series of yes/no answers to the following question: Is the current sending rate (or window) larger than the network capacity? The current minimum window can be estimated as the window size at which the flow does not see any packet loss. If the maximum window size is known, a binary search technique is performed to set the target window size to the midpoint of the maximum window size and the minimum window size. As the target window size increases, if packet loss is detected, the current window size can be treated as a new maximum size, and the reduced window size after the packet loss can be the new minimum window size. The midpoint between these new values becomes a new target window size. This process continues until the difference between the minimum window size and maximum window size is smaller than a threshold value called the minimum increment (Smin). This will avoid oscillation around the target window.

Cubic TCP

Cubic TCP is a less aggressive and more systematic derivative of BIC TCP, in which the window size is a cubic function of time since the last congestion event, with the inflection point set to the window size prior to the event. Being a cubic function, there are two components to window growth. The first component is a concave portion in which the window quickly ramps up to the window size before the last congestion event. The second component is a convex portion in which cubic TCP probes for more bandwidth, slowly at first then very rapidly. Further, cubic TCP spends time at a plateau between the concave portion and the convex portion, which allows the network to stabilize before cubic TCP begins looking for more bandwidth.

Another major difference between cubic TCP and standard TCP flavors is that cubic TCP does not rely on the receipt of ACKs to increase the window size. Rather, cubic TCP's window size is dependent only on the last congestion event. Under standard TCP, flows with very short round-trip times (RTTs) will receive ACKs faster, and therefore have their congestion windows grow faster than other flows with longer RTTs. Further, cubic TCP allows for more fairness between flows since the window growth is independent of RTT.

Compound TCP

Compound TCP is designed to aggressively adjust the sender's congestion window to optimize TCP for connections with large bandwidth-delay products (BDPs) while trying not to harm fairness TCP Westwood TCP Westwood is a sender-side-only modification to TCP New Reno that is intended to better handle large BDP paths, e.g., large pipes, with potential packet loss due to transmission or other errors, e.g., leaky pipes, and with dynamic loading, e.g., dynamic pipes. TCP Westwood relies on mining the ACK stream for information to help it better set the congestion control parameters: ssthresh and congestion window (cwin). An "Eligible Rate" is estimated and used by the sender to update ssthresh and cwin upon packet loss indication, or during an "Agile Probing" phase, which is a proposed modification to the "Slow Start" phase. In addition, a scheme called Persistent Non Congestion Detection has been devised to detect persistent lack of congestion, and induce the Agile Probing phase to expeditiously utilize large dynamic bandwidth.

Significant efficiency gains can be obtained, via TCP Westwood, for large leaky dynamic pipes, while maintaining fairness. Under a more appropriate criterion for friendliness, i.e. "opportunistic friendliness", TCP Westwood is shown to have good, and controllable, friendliness.

TCP Westwood+

TCP Westwood+ is a sender-side only modification of the TCP Reno protocol stack that optimizes the performance of TCP congestion control over both wireline and wireless networks. TCP Westwood+ is based on end-to-end bandwidth estimation to set respective sizes of the congestion window and ssthresh after a congestion episode, i.e., after three duplicate ACKs are detected, received, etc., or after a timeout event. The bandwidth is estimated by low-pass filtering a rate of returning ACK packets. In contrast with TCP Reno, which blindly halves the congestion window after three duplicate ACKs have been received, TCP Westwood+ adaptively sets the respective sizes of the congestion window and ssthresh, e.g., to take into account the bandwidth used at a time congestion is experienced. In this regard, TCP Westwood+ increases throughput over wireless links, compared to TCP Reno/TCP New Reno in wired networks.

Returning now to FIG. 2, congestion control component 130 can be configured to select, based on a connection attribute for a connection corresponding to a connection request received from a client device, a communication congestion control procedure, e.g., of the communication congestion control procedures that have been stored in the kernel, for servicing of the connection request. In an embodiment, the servicing of the connection request comprises transferring, using the communication congestion control procedure via server application 120, data between file server 110 and the client device, e.g., client 140, client 150, etc.

In one embodiment, the transferring of the data comprises implementing, via server application 120, a socket (not shown) in the kernel using a socket structure struct socket, which comprises a general abstraction of a connection endpoint and information that server application 120 can use to transmit/receive data to/from the client device. In an embodiment, the socket has two buffer control substructures: a receive buffer (not shown), e.g., a receive sockbuf, which is used to receive request data from the client device; and a send buffer (not shown), e.g., a send sockbuf, which is used to transmit corresponding reply data to the client device.

In this regard, after the socket has been established in the kernel, server application 120 can be configured to receive, from the client device using the congestion control procedure, the data into the receive buffer of the socket. Further, server application 120 can be configured to send, using the congestion control procedure, the data from the send buffer of the socket to the client device.

FIGS. 4-10 illustrate methodologies for performing operations corresponding to file server 110, in accordance with various example embodiments. For simplicity of explanation, the methodologies are depicted and described as a series of acts. It is to be understood and appreciated that various embodiments disclosed herein are not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 4:
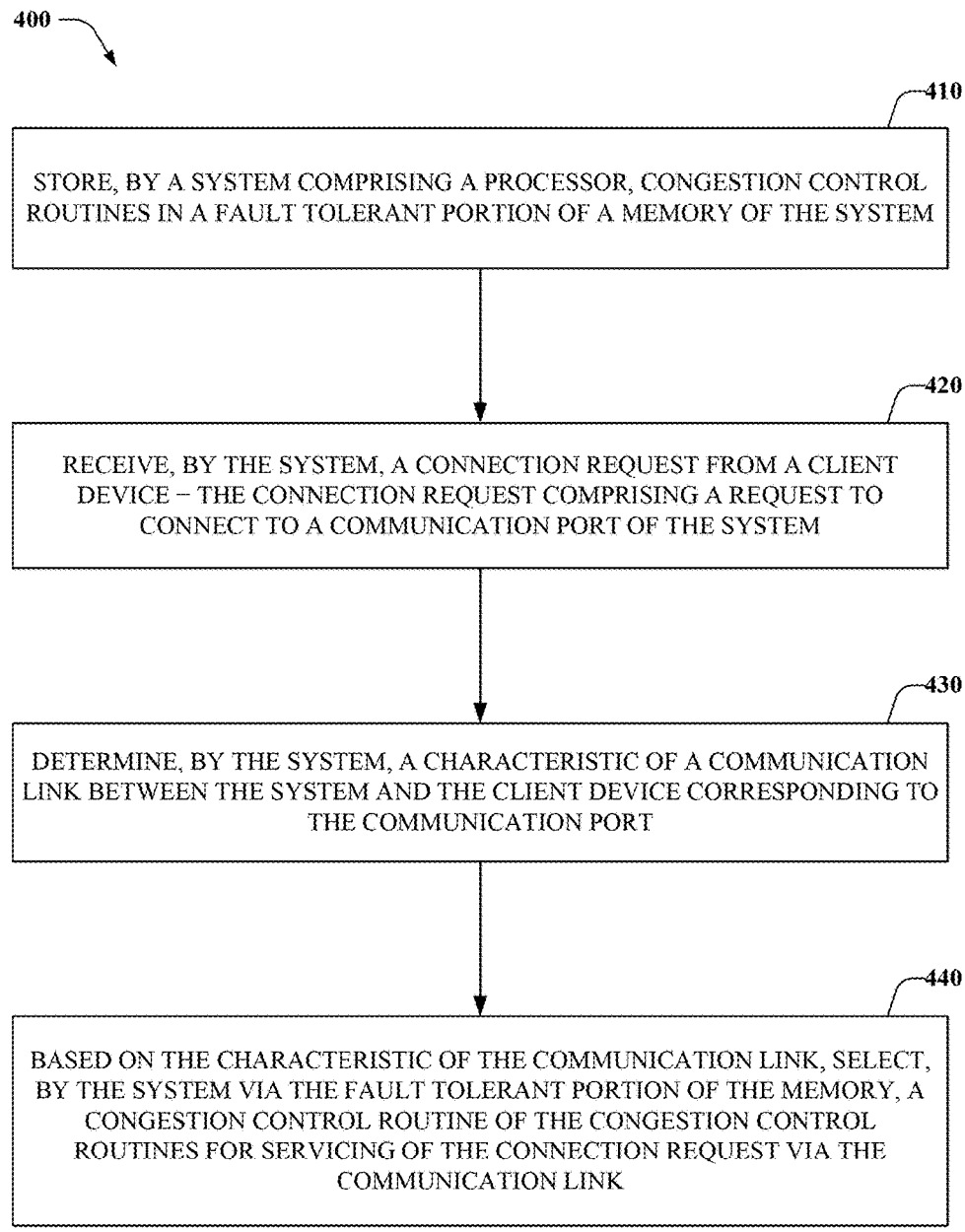
FIG. 4 illustrates a flowchart of a method associated with connection based selection of a network congestion control process, in accordance with various example embodiments.

FIG. 4 illustrates a flowchart (400) of a method associated with connection based selection of a network congestion control process, in accordance with various example embodiments. At 410, a system comprising a processor, e.g., file server 110, can store congestion control routines in a fault tolerant portion of a memory of the system—the congestion control routines comprising a TCP New Reno procedure, a BIC TCP procedure, a cubic TCP procedure, a compound TCP procedure, a Westwood TCP procedure, and a Westwood+ TCP procedure.

At 420, the system can receive a connection request from a client device—the connection request comprising a request to connect, via a communication link, to a communication port of the system. At 430, the system can determine a characteristic of the communication link, e.g., an RTT of the communication link, a BDP of the communication link, a bandwidth of the communication link, and whether the communication link is a wireless communication link.

At 440, the system can select, based on the characteristic of the communication link via the fault tolerant portion of the memory, a congestion control routine of the congestion control routines for use to service the connection request via the communication link. In one embodiment, the servicing can comprise transferring, using the congestion control routine, data between the system and the client device.

Figure 5:
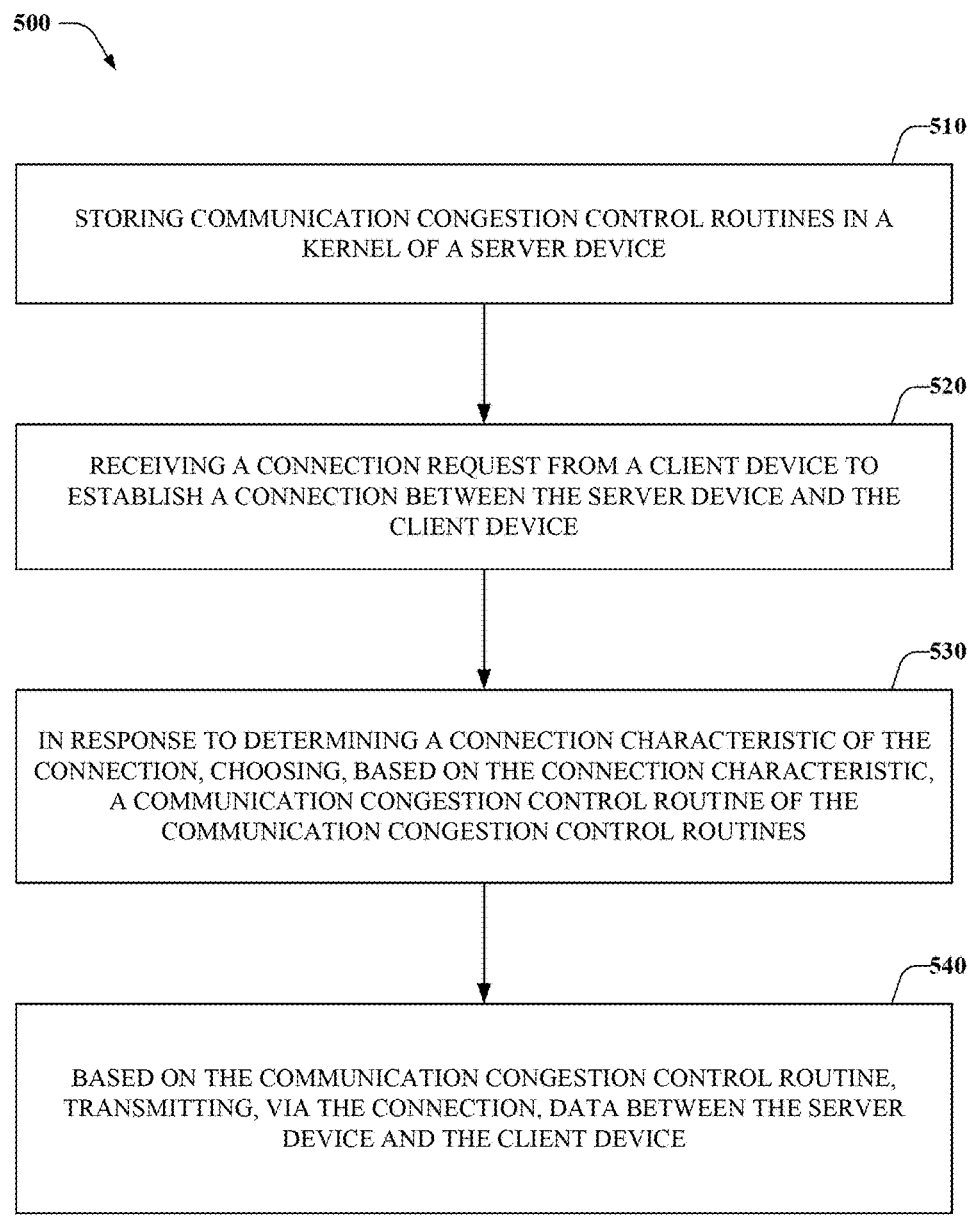
FIG. 5 illustrates a flow chart of another method associated with connection based selection of a network congestion control process, in accordance with various example embodiments.
Figure 6:
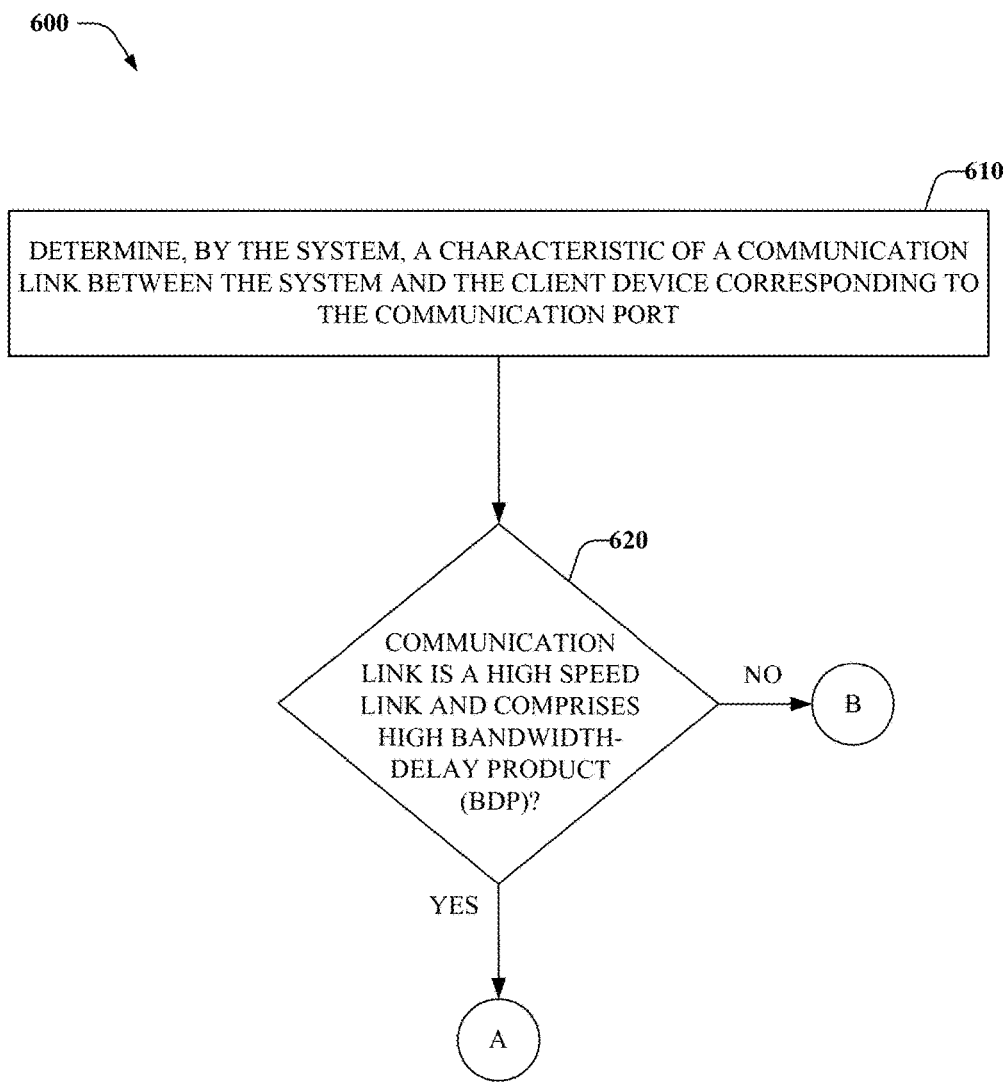
FIGS. 6-10 illustrate flowcharts of a method for dynamically selecting a network congestion control procedure, in accordance with various example embodiments.
Figure 7:
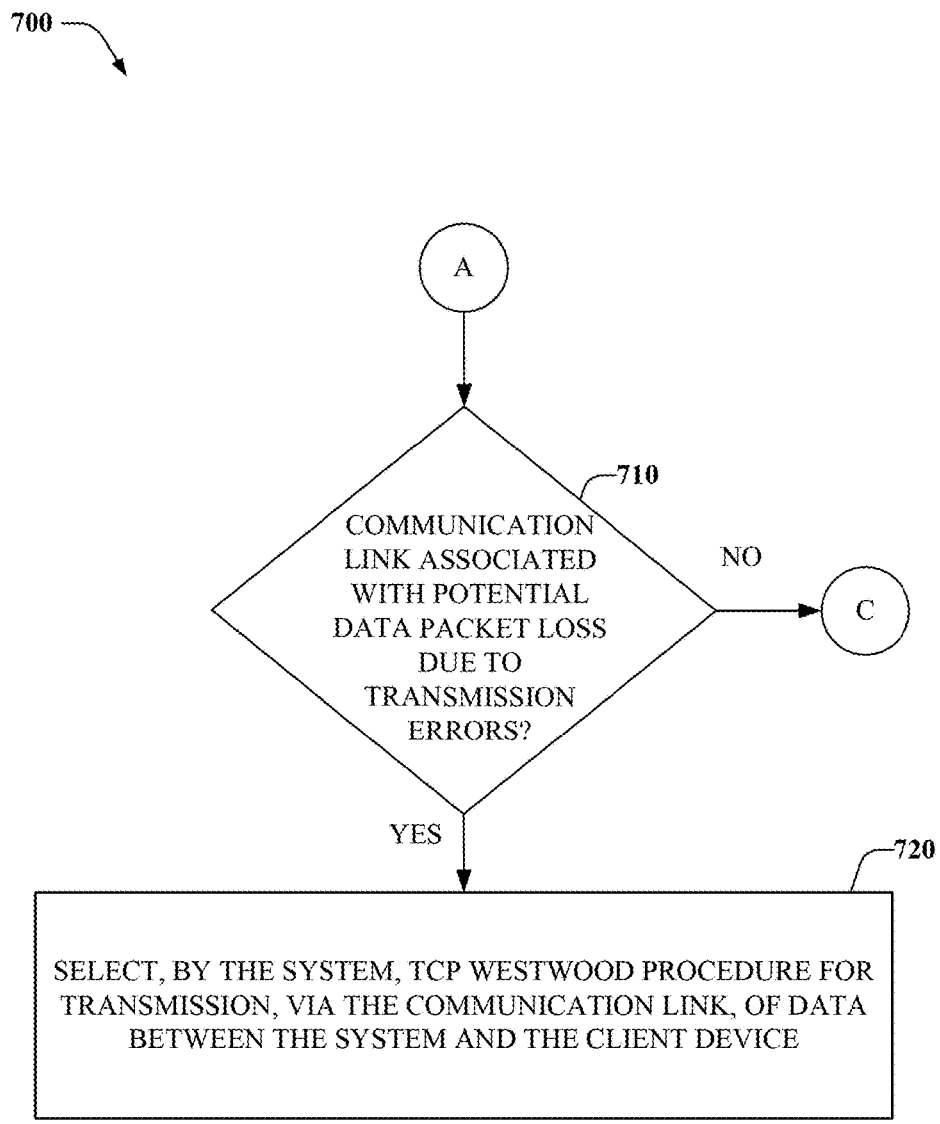
Figure 8:
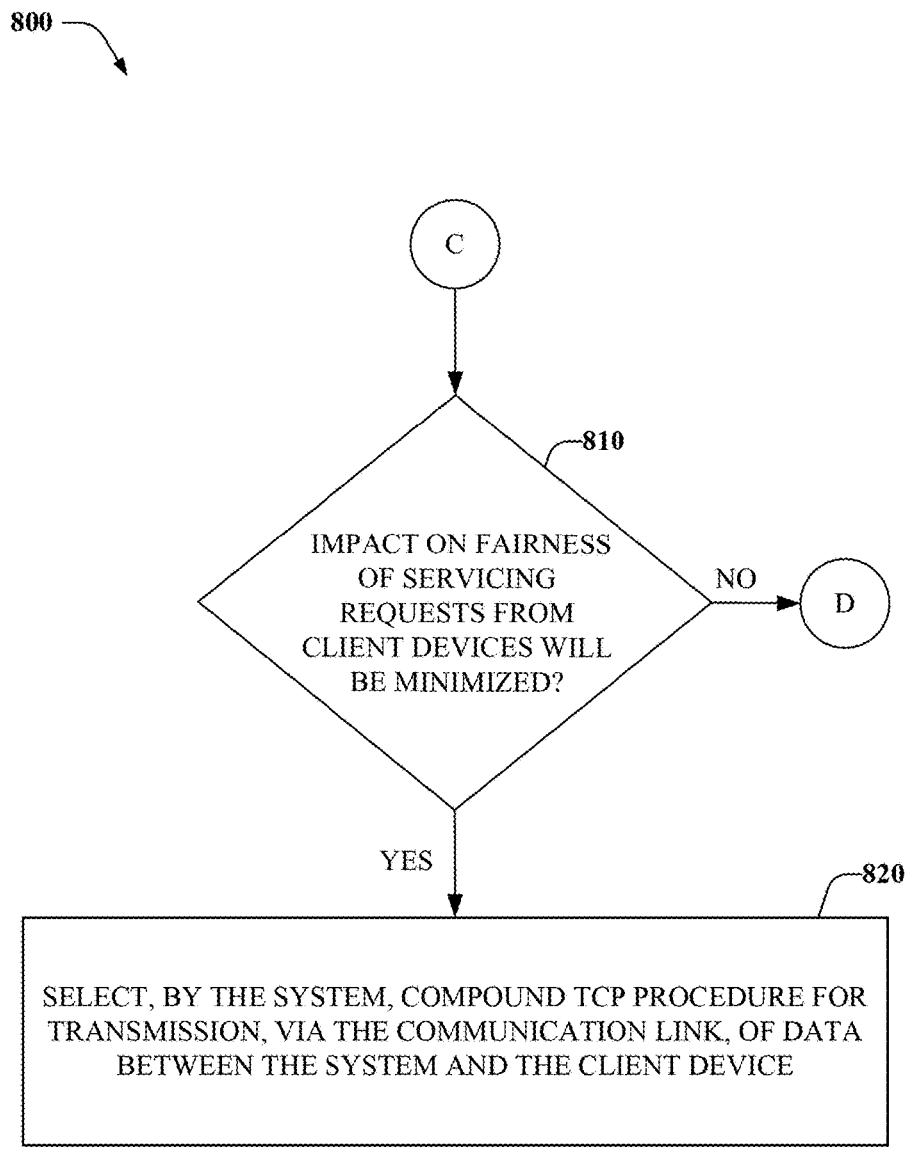
Figure 9:
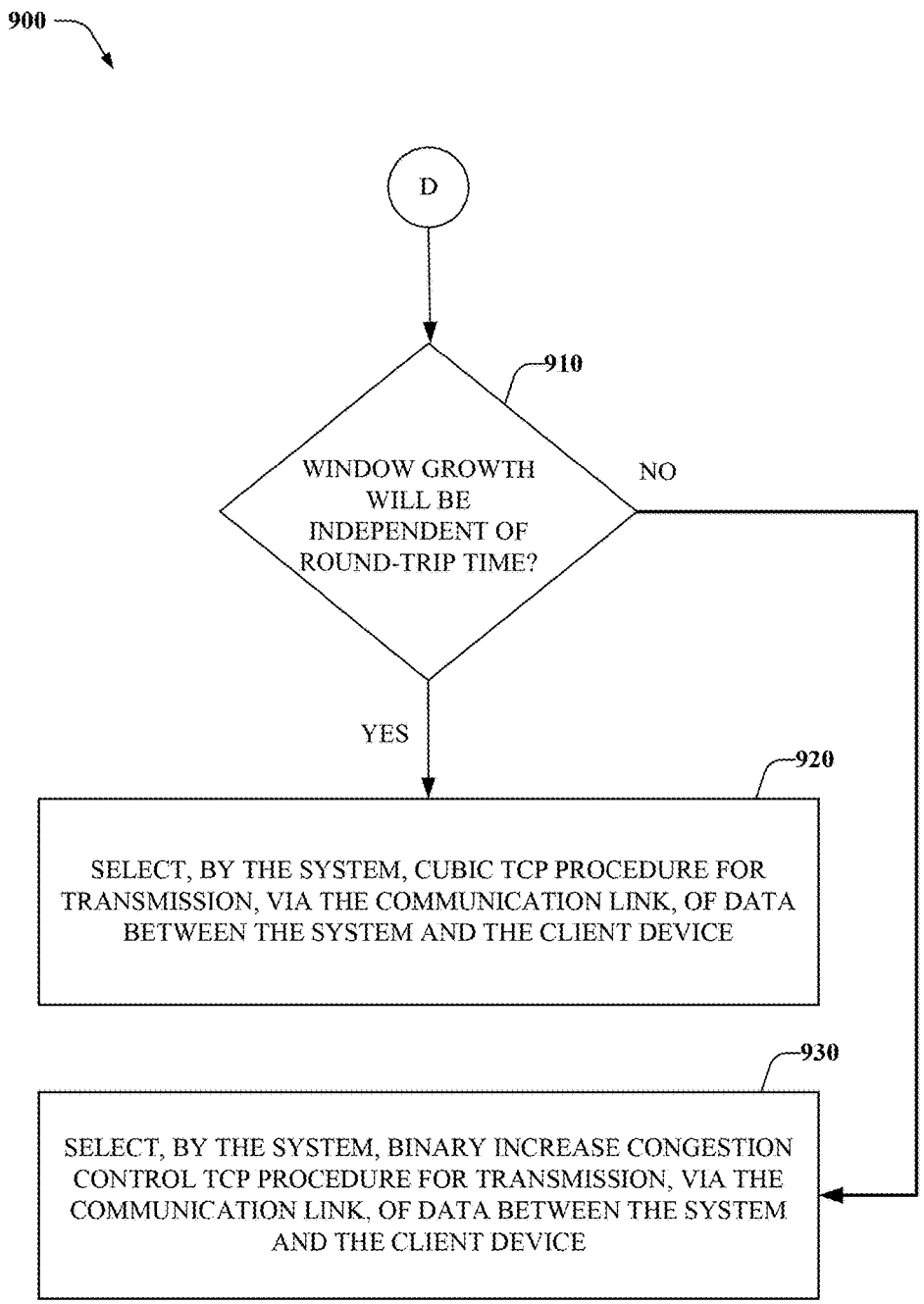
Figure 10:
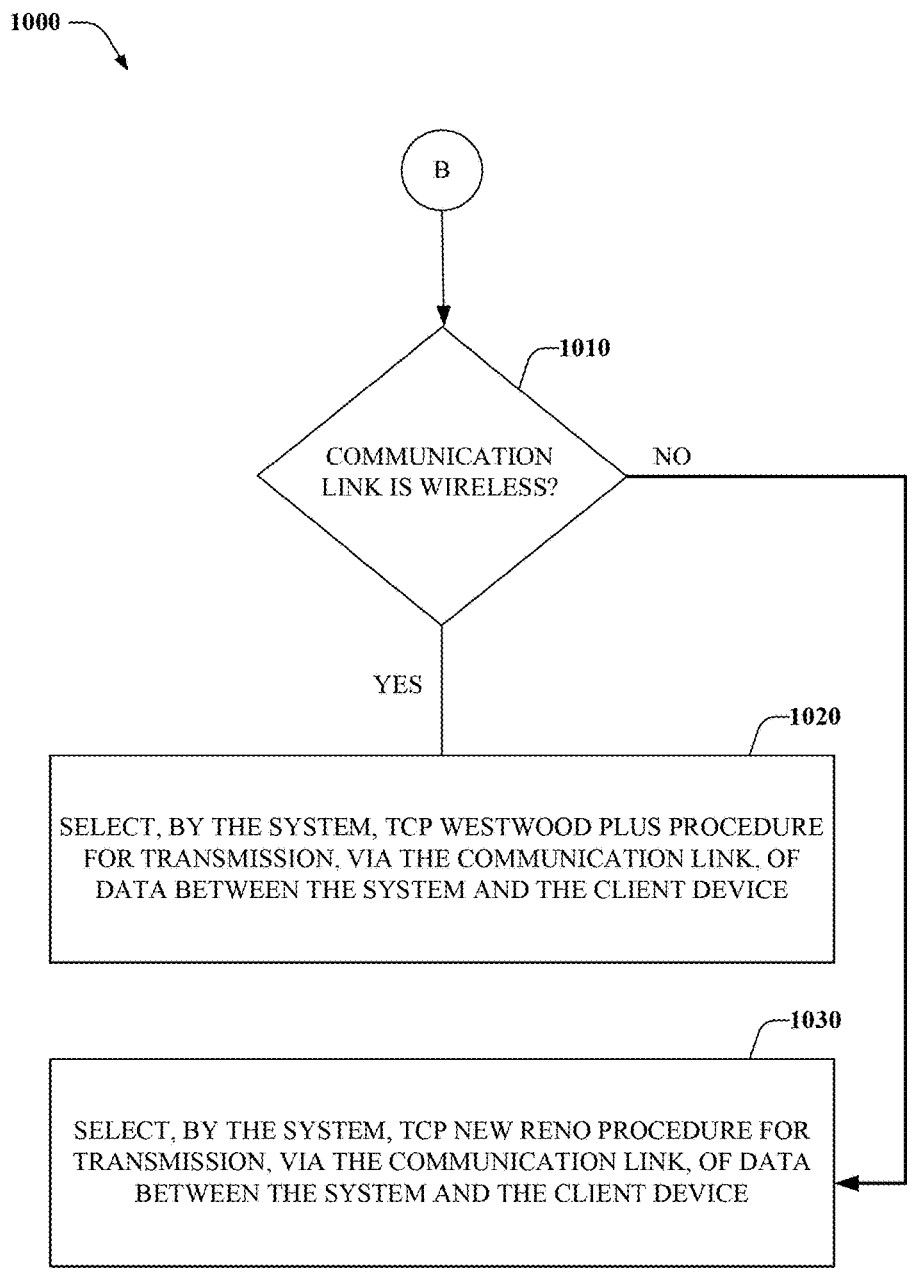

FIG. 5 illustrates a flowchart (500) of another method associated with a connection based selection of a network congestion control process, in accordance with various example embodiments. At 510, communication congestion control routines can be stored in a kernel of a server device. At 520, a connection request can be received, by the server device, from a client device to establish a connection between the server device and the client device. At 530, based on a determination of a connection characteristic of the connection, a communication congestion control routine of the communication congestion control routines can be chosen, by the server device. At 540, data can be communicated, based on the communication congestion control routine, between the server device and the client device via the connection.

Now referring to FIGS. 6-10, flowcharts (600-1000) of a method, e.g., performed by a system, e.g., file server 120, for dynamic selection of a network congestion control procedure are illustrated, in accordance with various example embodiments. At 610, a characteristic of a communication link between the system and a client device corresponding to a communication port of the system can be determined.

At 620, it can be determined whether the communication link is a high-speed link, e.g., comprising a bandwidth greater than 1 Gbit/s, and whether the communication link comprises a high BDP, e.g., corresponding to a bandwidth greater than 1 Gbit/s, and an RTT greater than 1 millisecond.

If it has been determined, at 620, that the communication link is a high-speed link and comprises a high BDP, flow continues to 710, at which it can be determined whether the communication link is associated with potential data packet loss due to transmission errors; otherwise, flow continues to 1010, at which it can be determined whether the communication link is wireless communication link.

At 710, if it has been determined that the communication link is associated with potential data packet loss due to transmission errors, flow continues to 720, at which the system can select a TCP Westwood procedure for transmission, via the communication link, of data between the system and the client device; otherwise, flow continues to 810, at which it can be determined whether an impact on fairness of servicing requests from client devices will be minimized.

At 810, if it has been determined that the impact on fairness of servicing the requests from the client devices will be minimized, flow continues to 820, at which the system can select a compound TCP procedure for transmission, via the communication link, of data between the system and the client device; otherwise, flow continues to 910, at which it can be determined whether window growth will be independent of RTT.

At 910, if it has been determined that window growth will be independent of RTT, flow continues to 920, at which the system can select a cubic TCP procedure for transmission, via the communication link, of data between the system and the client device; otherwise flow continues to 930, at which the system can select a BIC TCP procedure for transmission, via the communication link, of data between the system and the client device.

Now referring to 1010, if it has been determined that the communication link is a wireless link, flow continues to 1020, at which the system can select a TCP Westwood+ procedure for transmission, via the communication link, of data between the system and the client device; otherwise flow continues to 1030, at which the system can select a TCP New Reno procedure for transmission, via the communication link, of data between the system and the client device.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

Furthermore, to the extent that the terms "includes," "has," "contains," and other similar words are used in either the detailed description or the appended claims, such terms are intended to be inclusive—in a manner similar to the term "comprising" as an open transition word—without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As utilized herein, the terms "logic," "logical," "logically," and the like are intended to refer to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

As utilized herein, terms "component," "system," "application," "server," "client" and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server, client, etc. and the server, client, etc. can be a component. One or more components can reside within a process, and a component can be localized on one computer and/or distributed between two or more computers.

Further, components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. In yet another example, a component can be an apparatus that provides specific functionality through electronic components without mechanical parts; the electronic components can comprise one or more processors therein to execute software and/or firmware that confer(s), at least in part, the functionality of the electronic components.

Aspects of systems, apparatus, and processes explained herein can constitute machine-executable instructions embodied within a machine, e.g., embodied in a computer readable medium (or media) associated with the machine. Such instructions, when executed by the machine, can cause the machine to perform the operations described. Additionally, the systems, processes, process blocks, etc. can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Furthermore, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art having the benefit of the instant disclosure.

The disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can comprise, but are not limited to, magnetic storage devices, e.g., hard disk; floppy disk; magnetic strip(s); optical disk (e.g., compact disk (CD), digital video disc (DVD), Blu-ray Disc (BD)); smart card(s); and flash memory device(s) (e.g., card, stick, key drive); and/or a virtual device that emulates a storage device and/or any of the above computer-readable media.

Artificial intelligence based systems, e.g., utilizing explicitly and/or implicitly trained classifiers, can be employed in connection with performing inference and/or probabilistic determinations and/or statistical-based determinations as in accordance with one or more aspects of the disclosed subject matter as described herein. For example, an artificial intelligence system can be used, via socket manager component 110, to dynamically apportion resources between sockets, socket groups, etc. as described herein.

A classifier can be a function that maps an input attribute vector, x=(x1, x2, x3, x4, xn), to a confidence that the input belongs to a class, that is, f(x)=confidence (class). Such classification can employ a probabilistic and/or statistical-based analysis (e.g., factoring into the analysis utilities and costs) to infer an action that a user desires to be automatically performed. In the case of communication systems, for example, attributes can be information received from access points, servers, components of a wireless communication network, etc., and the classes can be categories or areas of interest (e.g., levels of priorities). A support vector machine is an example of a classifier that can be employed. The support vector machine operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein can also be inclusive of statistical regression that is utilized to develop models of priority.

In accordance with various aspects of the subject specification, artificial intelligence based systems, components, etc. can employ classifiers that are explicitly trained, e.g., via a generic training data, etc. as well as implicitly trained, e.g., via observing characteristics of communication equipment, e.g., a server, etc., receiving reports from such communication equipment, receiving operator preferences, receiving historical information, receiving extrinsic information, etc. For example, support vector machines can be configured via a learning or training phase within a classifier constructor and feature selection module. Thus, the classifier(s) can be used by an artificial intelligence system to automatically learn and perform a number of functions, e.g., performed by file server 110.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," "data storage," "database," "storage medium," "socket", and substantially any other information storage component relevant to operation and functionality of a component and/or process, can refer to "memory components," or entities embodied in a "memory," or components comprising the memory. It will be appreciated that the memory components described herein can be either volatile memory or nonvolatile memory, or can comprise both volatile and nonvolatile memory.

By way of illustration, and not limitation, nonvolatile memory, for example, can be included in server application memory 120, congestion control component 130, non-volatile memory 1122 (see below), disk storage 1124 (see below), and/or memory storage 1146 (see below). Further, nonvolatile memory can be included in read only memory (ROM), programmable ROM (PROM), electrically programmable ROM (EPROM), electrically erasable ROM (EEPROM), or flash memory. Volatile memory 1120 can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 11:
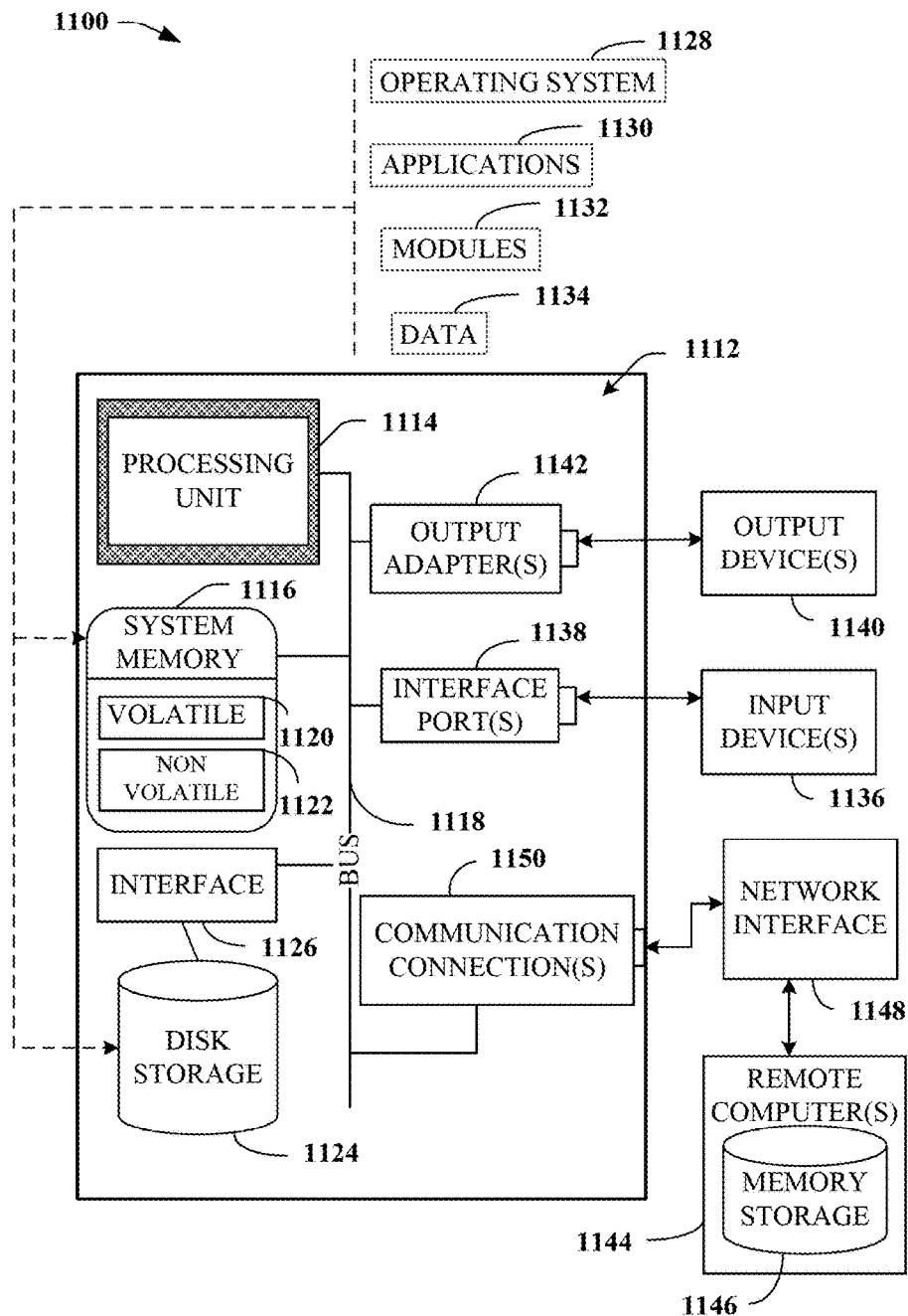
FIG. 11 illustrates a block diagram representing an illustrative non-limiting computing system or operating environment in which one or more aspects of various embodiments described herein can be implemented.

In order to provide a context for the various aspects of the disclosed subject matter, FIG. 11, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that various embodiments disclosed herein can be implemented in combination with other program modules. Generally, program modules comprise routines, programs, components, data structures, etc. that perform particular tasks and/or implement particular abstract data types.

Moreover, those skilled in the art will appreciate that the inventive systems can be practiced with other computer system configurations, comprising single-processor or multiprocessor computer systems, computing devices, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communication network; however, some if not all aspects of the subject disclosure can be practiced on stand-alone computers. In a distributed computing environment, program modules can be located in both local and remote memory storage devices.

With reference to FIG. 11, a block diagram of a computing system 1100, e.g., file server 110, operable to execute the disclosed systems and methods is illustrated, in accordance with an embodiment. Computer 1112 comprises a processing unit 1114, a system memory 1116, and a system bus 1118. System bus 1118 couples system components comprising, but not limited to, system memory 1116 to processing unit 1114. Processing unit 1114 can be any of various available processors. Dual microprocessors and other multiprocessor architectures also can be employed as processing unit 1114.

System bus 1118 can be any of several types of bus structure(s) comprising a memory bus or a memory controller, a peripheral bus or an external bus, and/or a local bus using any variety of available bus architectures comprising, but not limited to, industrial standard architecture (ISA), micro-channel architecture (MSA), extended ISA (EISA), intelligent drive electronics (IDE), VESA local bus (VLB), peripheral component interconnect (PCI), card bus, universal serial bus (USB), advanced graphics port (AGP), personal computer memory card international association bus (PCMCIA), Firewire (IEEE 1394), small computer systems interface (SCSI), and/or controller area network (CAN) bus used in vehicles.

System memory 1116 comprises volatile memory 1120 and nonvolatile memory 1122. A basic input/output system (BIOS), containing routines to transfer information between elements within computer 1112, such as during start-up, can be stored in nonvolatile memory 1122. By way of illustration, and not limitation, nonvolatile memory 1122 can comprise ROM, PROM, EPROM, EEPROM, or flash memory. Volatile memory 1120 comprises RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1112 also comprises removable/non-removable, volatile/non-volatile computer storage media. FIG. 11 illustrates, for example, disk storage 1124. Disk storage 1124 comprises, but is not limited to, devices like a magnetic disk drive, floppy disk drive, tape drive, Jaz drive, Zip drive, LS-100 drive, flash memory card, or memory stick. In addition, disk storage 1124 can comprise storage media separately or in combination with other storage media comprising, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to system bus 1118, a removable or non-removable interface is typically used, such as interface 1126.

It is to be appreciated that FIG. 11 describes software that acts as an intermediary between users and computer resources described in suitable operating environment 1100. Such software comprises an operating system 1128. Operating system 1128, which can be stored on disk storage 1124, acts to control and allocate resources of computer system 1112. System applications 1130 take advantage of the management of resources by operating system 1128 through program modules 1132 and program data 1134 stored either in system memory 1116 or on disk storage 1124. It is to be appreciated that the disclosed subject matter can be implemented with various operating systems or combinations of operating systems.

A user can enter commands or information into computer 1112 through input device(s) 1136. Input devices 1136 comprise, but are not limited to, a pointing device such as a mouse, trackball, stylus, touch pad, keyboard, microphone, joystick, game pad, satellite dish, scanner, TV tuner card, digital camera, digital video camera, web camera, cellular phone, user equipment, smartphone, and the like. These and other input devices connect to processing unit 1114 through system bus 1118 via interface port(s) 1138. Interface port(s) 1138 comprise, for example, a serial port, a parallel port, a game port, a universal serial bus (USB), a wireless based port, e.g., Wi-Fi, Bluetooth, etc. Output device(s) 1140 use some of the same type of ports as input device(s) 1136.

Thus, for example, a USB port can be used to provide input to computer 1112 and to output information from computer 1112 to an output device 1140. Output adapter 1142 is provided to illustrate that there are some output devices 1140, like display devices, light projection devices, monitors, speakers, and printers, among other output devices 1140, which use special adapters. Output adapters 1142 comprise, by way of illustration and not limitation, video and sound devices, cards, etc. that provide means of connection between output device 1140 and system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. Remote computer(s) 1144 can be a personal computer, a server, a router, a network PC, a workstation, a microprocessor based appliance, a peer device, or other common network node and the like, and typically comprises many or all of the elements described relative to computer 1112.

For purposes of brevity, only a memory storage device 1146 is illustrated with remote computer(s) 1144. Remote computer(s) 1144 is logically connected to computer 1112 through a network interface 1148 and then physically and/or wirelessly connected via communication connection 1150. Network interface 1148 encompasses wire and/or wireless communication networks such as local-area networks (LAN) and wide-area networks (WAN). LAN technologies comprise fiber distributed data interface (FDDI), copper distributed data interface (CDDI), Ethernet, token ring and the like. WAN technologies comprise, but are not limited to, point-to-point links, circuit switching networks like integrated services digital networks (ISDN) and variations thereon, packet switching networks, and digital subscriber lines (DSL).

Communication connection(s) 1150 refer(s) to hardware/software employed to connect network interface 1148 to bus 1118. While communication connection 1150 is shown for illustrative clarity inside computer 1112, it can also be external to computer 1112. The hardware/software for connection to network interface 1148 can comprise, for example, internal and external technologies such as modems, comprising regular telephone grade modems, cable modems and DSL modems, wireless modems, ISDN adapters, and Ethernet cards.

The computer 1112 can operate in a networked environment using logical connections via wired and/or wireless communications to one or more remote computers, cellular based devices, user equipment, smartphones, or other computing devices, such as workstations, server computers, routers, personal computers, portable computers, microprocessor-based entertainment appliances, peer devices or other common network nodes, etc. The computer 1112 can connect to other devices/networks by way of antenna, port, network interface adaptor, wireless access point, modem, and/or the like.

The computer 1112 is operable to communicate with any wireless devices or entities operatively disposed in wireless communication, e.g., a printer, scanner, desktop and/or portable computer, portable data assistant, communications satellite, user equipment, cellular base device, smartphone, any piece of equipment or location associated with a wirelessly detectable tag (e.g., scanner, a kiosk, news stand, restroom), and telephone. This comprises at least Wi-Fi and Bluetooth wireless technologies. Thus, the communication can be a predefined structure as with a conventional network or simply an ad hoc communication between at least two devices.

Wi-Fi allows connection to the Internet from a desired location (e.g., a vehicle, couch at home, a bed in a hotel room, or a conference room at work, etc.) without wires. Wi-Fi is a wireless technology similar to that used in a cell phone that enables such devices, e.g., mobile phones, computers, etc., to send and receive data indoors and out, anywhere within the range of a base station. Wi-Fi networks use radio technologies called IEEE 802.11 (a, b, g, etc.) to provide secure, reliable, fast wireless connectivity. A Wi-Fi network can be used to connect communication devices (e.g., mobile phones, computers, etc.) to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
   a processor; and
   a memory that stores executable instructions that, when executed by the processor, facilitate performance of operations, comprising:
   storing communication congestion control procedures to a module of a kernel of the system;
   determining a connection attribute for a connection corresponding to a connection request received from a device; and
   selecting, via the module of the kernel and based on the connection attribute, a communication congestion control procedure of the communication congestion control procedures for servicing of the connection request, wherein the selecting comprises
   in response to first determining, based on the connection attribute, that the connection comprises a high-speed link comprising a bandwidth that is greater than one gigabit per second and is associated with potential data packet loss due to respective transmission errors, first selecting, via the module of the kernel, a first transmission control protocol (TCP) procedure of the communication congestion control procedures for the servicing of the connection request, and
   in response to second determining, based on the connection attribute, that duplicate acknowledgments (ACKs) have been received in the connection, second selecting, via the module of the kernel, a second TCP procedure of the communication congestion control procedures for the servicing of the connection request, wherein the first TCP procedure adjusts, based on a determined rate of ACKs that have been received via the connection, congestion control parameters comprising a congestion window of the connection, and wherein the second TCP procedure initiates a retransmission of data via the connection.

2. The system of claim 1, wherein the connection request comprises a TCP based request, and wherein the first TCP procedure is a Westwood TCP procedure.

3. The system of claim 2, wherein the communication congestion control procedures further comprise at least one of:
   a binary increase congestion control (BIC) TCP based procedure that adjusts a size of the congestion window of the connection using a binary search procedure;
   a cubic TCP based procedure that adjusts the size of the congestion window based on a cubic function of time since a most recent congestion event has been determined to occur;
   a compound TCP based procedure that adjusts the size of a sending window based on a sum of the size of the congestion window and another size of a delay window; or
   a Westwood Plus TCP based procedure that adaptively adjusts the congestion control parameters based on an amount of the bandwidth used at a time that congestion has been determined to occur.

4. The system of claim 1, wherein the determining the connection attribute comprises:
   determining a round-trip time of the connection.

5. The system of claim 1, wherein the determining the connection attribute comprises:
   determining a bandwidth-delay product of the connection.

6. The system of claim 1, wherein the determining the connection attribute comprises:
   determining whether the connection is a wireless connection.

7. The system of claim 1, wherein the determining the connection attribute comprises:
   determining the bandwidth.

8. The system of claim 1, wherein the servicing of the connection request comprises:
   transferring, based on the communication congestion control procedure via the connection, the data between the system and the device.

9. The system of claim 8, wherein the transferring the data between the system and the device comprises:
   receiving, from the device using the congestion control procedure, the data into a receive buffer of a socket of the system.

10. The system of claim 8, wherein the transferring the data between the system and the device comprises:
    sending, using the congestion control procedure, the data from a send buffer of a socket of the system to the device.

11. A method, comprising:
    storing, by a system comprising a processor, congestion control routines in a fault tolerant portion of a memory of the system;
    receiving, by the system, a connection request from a client device, wherein the connection request comprises a request to connect to a communication port of the system;
    in response to the receiving the connection request, determining, by the system, a characteristic of a communication link between the system and the client device corresponding to the communication port; and
    based on the characteristic of the communication link, selecting, by the system via the fault tolerant portion of the memory, a congestion control routine of the congestion control routines for use to service the connection request via the communication link, wherein the selecting comprises
       based on the communication link being determined to comprise a bandwidth that is greater than one gigabit per second and be associated with potential data packet loss due to respective transmission errors, first selecting, via the fault tolerant portion of the memory, a first transmission control protocol (TCP) routine of the congestion control routines and transmitting, using the first TCP routine, data between the system and the client device via the communication link, and
       in response to duplicate acknowledgments (ACKs) being determined to have been received in the communication link, second selecting, via the fault tolerant portion of the memory, a second TCP routine of the congestion control routines and transmitting, using the second TCP routine, the data between the system and the client device via the communication link, wherein the first TCP routine adjusts, based on a rate of the ACKs being determined to have been received in the communication link, congestion control parameters comprising a congestion window of the communication link, and wherein the second TCP procedure triggers a retransmission of the data.

12. The method of claim 11, wherein the determining the characteristic comprises:
    determining a round-trip time of the communication link.

13. The method of claim 11, wherein the determining the characteristic comprises:
    determining a bandwidth-delay product of the communication link.

14. The method of claim 11, wherein the use to service the connection request comprises:
    transmitting, using a binary increase congestion control (BIC) TCP procedure, the data between the system and the client device via the communication link, wherein the BIC TCP procedure adjusts a size of the congestion window using a binary search procedure; or
    transmitting, using a cubic TCP procedure, the data between the system and the client device via the communication link, wherein the cubic TCP procedure adjusts the size of the congestion window based on a cubic function of time since a most recent congestion event being determined to have occurred in the communication link.

15. The method of claim 11, wherein the use to service the communication request comprises:
    transmitting, using a compound TCP procedure, the data between the system and the client device via the communication link, wherein the compound TCP procedure adjusts the size of a sending window of the communication link based on a sum of the size of the congestion window and another size of a delay window of the communication link.

16. The method of claim 11, wherein the use to service the communication request comprises:
    transmitting, using a Westwood Plus TCP procedure, the data between the system and the client device via the communication link, wherein the Westwood Plus TCP procedure adaptively adjusts the congestion control parameters based on an amount of the bandwidth being determined to have been used at a time of congestion within the communication link.

17. A computer-readable storage medium comprising instructions that, in response to execution, cause a server device comprising a processor to perform operations, comprising:
  storing communication congestion control routines in a kernel of the server device;
  receiving a connection request from a client device to establish a connection between the server device and the client device;
  in response to determining a connection characteristic of the connection, choosing, based on the connection characteristic, a communication congestion control routine of the communication congestion control routines; and
  communicating, via the connection, data between the server device and the client device using the communication congestion control routine, wherein the choosing comprises
    in response to a bandwidth of the connection being determined to satisfy a defined condition representing the connection corresponds to a high-speed link and a potential data packet loss due to respective transmission errors, first choosing, via the kernel, a first communication congestion control routine of the communication congestion control routines for the communicating the data between the server device and the client device using a Westwood transmission control protocol (TCP), and
    in response to duplicate acknowledgements being determined to have been received, second choosing, via the kernel, a second communication congestion control routine of the communication congestion control routines for the communicating the data between the server device and the client device using a New Reno TCP.

18. The computer-readable storage medium of claim 17, wherein the determining the connection characteristic of the connection comprises at least one of:
  determining a round-trip time of the connection;
  determining a bandwidth-delay product of the connection;
  determining whether the connection is a wireless connection; or
  determining the bandwidth.

19. The computer-readable storage medium of claim 17, wherein the communicating the data comprises:
  receiving, from the client device via the connection using the communication congestion control routine, the data into a receive buffer of a socket of the server device.

20. The computer-readable storage medium of claim 17, wherein the communicating the data comprises:
  sending, via the connection using the communication congestion control routing, the data from a send buffer of a socket of the server device to the client device.

* * * * *